United States Patent [19]
Sbarro

[11] Patent Number: 5,121,809
[45] Date of Patent: Jun. 16, 1992

[54] VEHICLE WITH LATERALLY ADJUSTABLE STEERING AXIS

[75] Inventor: Franco Sbarro, Les Tuileries-de-Grandson, Switzerland

[73] Assignee: SM Sbarro Mottas Engineering S.A., Switzerland

[21] Appl. No.: 582,975

[22] PCT Filed: Jan. 29, 1990

[86] PCT No.: PCT/CH90/00019
  § 371 Date: Sep. 28, 1990
  § 102(e) Date: Sep. 28, 1990

[87] PCT Pub. No.: WO90/08688
  PCT Pub. Date: Aug. 9, 1990

[30] Foreign Application Priority Data
  Jan. 30, 1989 [FR] France .................. 89 01324

[51] Int. Cl.$^5$ .................................. B62K 11/00
[52] U.S. Cl. ........................ 180/223; 280/772; 301/1
[58] Field of Search .......... 180/219, 222, 223, 224, 180/341, 238; 280/772, 279, 280; 301/1

[56] References Cited

U.S. PATENT DOCUMENTS

| | | | |
|---|---|---|---|
| 4,045,096 | 8/1977 | Lidov | 305/7 |
| 4,526,249 | 7/1985 | Parker | 180/219 |
| 4,723,621 | 2/1988 | Kawano et al. | 180/219 |
| 4,726,603 | 2/1988 | Sugiyama et al. | 280/661 |
| 4,813,511 | 3/1989 | Yamaguchi et al. | 180/219 |
| 4,836,577 | 6/1989 | Abe et al. | 280/660 X |
| 5,014,808 | 5/1991 | Savard et al. | 180/224 X |

FOREIGN PATENT DOCUMENTS

| | | | |
|---|---|---|---|
| 321803 | 6/1989 | European Pat. Off. | 280/279 |
| 890247 | 2/1944 | France . | |
| 141383 | 5/1990 | Japan | 180/222 |
| 90/00477 | 1/1990 | World Int. Prop. O. | 301/1 |

Primary Examiner—Charles A. Marmor
Assistant Examiner—Kevin Hurley
Attorney, Agent, or Firm—Davis, Bujold & Streck

[57] ABSTRACT

The steering wheel (10) of the vehicle is comprised of a plate (40) mounted in an appropriate annular guide (42) integral with the suspension arm (17) of the vehicle, the plate carrying a second roller bearing (24) fixed excentrically to the plate. The exterior element of the roller bearing is integral with the plate (40) and the integral element of the roller bearing is linked to the wheel (10). An electric motor (47) may drive a screw (49) and, as a result, makes the plate (40) pivot about its pivot axis (41). Thereby, the operator of the vehicle may modify the offset of the wheel (10) to displace the median axis (46) to either side from its central position. As a consequence, road handling and stability of the vehicle are improved.

7 Claims, 2 Drawing Sheets

VEHICLE WITH LATERALLY ADJUSTABLE STEERING AXIS

BACKGROUND OF THE INVENTION

The present invention concerns a motorized or tractor drawn vehicle designed for travel on a particular surface, said vehicle comprising at least two wheels, at least one of which is a drive wheel, each of these wheels comprising a central portion connected to the base structure of the vehicle and a peripheral portion concentric to the said central portion and disposed to turn about the central portion, said central portion and said peripheral portion being interconnected by means of at least a first ring shaped bearing, said first bearing comprising at least one interior annular element integral with the said central portion of the wheel and at least one peripheral annular portion concentric to the said interior annular portion and integral with the said peripheral portion, said latter portion having a contact means appropriate to the nature of the surface with which the vehicle will be in contact, and the said central portion of the wheel being connected to the base structure of the vehicle at least one connection point which is off-center on the wheel, wherein the said drive wheel is connected to the base structure of the vehicle by at least a second bearing disposed in a plane perpendicular to the plane of the said first bearing and comprising a first interior element integral with the interior annular element of the said first bearing and a second exterior element integral with the base structure of the vehicle.

Vehicles of this type are already known, particularly motorcycles in which the provision of a drive wheel such as that described above offers considerable advantages with respect to road traction, stability, ease of manipulation, braking safety, and lightness, by virtue of a new concept for the supporting structure, etc.

High performance motorcycles, especially racing motorcycles, must be able to respond to extreme conditions without endangering the driver. Nonetheless, with known vehicles, these conditions sometimes exceed performance capabilities and cause accidents. In these situations, the driver generally cannot avoid falling.

SUMMARY OF THE INVENTION

The present invention proposes to overcome this disadvantage and has as its object the provision of a novel, auxiliary means with which the driver can extricate himself from a situation which would be irreversible if he were at the wheel of a conventional motorcycle. This means is a device for controlling deviation of the drive wheel, capable of generating restoring torque when a critical degree of tilting has been reached or even surpassed.

To achieve this, the vehicle according to the invention is characterized in that the said second bearing is excentrically mounted on a plate pivotable around an axle perpendicular to the plane of the plate and parallel to the arc of the second bearing, and in that the vehicle is provided with a device disposed to cause the said plate to pivot around its axis.

According to a particularly advantageous embodiment, the plate is attached to a annular guide integral with the suspension arm of the drive wheel of the vehicle.

According to a preferred embodiment, the device which causes the said plate to pivot comprises a screw driven by an electric motor, said screw engaging a toothed portion integral with the said plate.

Preferably, the said second bearing is mounted in an off-center opening disposed in the plate and is attached to said plate by means of its second exterior element.

Said second exterior element of the second bearing may be attached to the plate by a peripheral connecting ring in the off-center opening in said plate.

According to a particularly advantageous embodiment, the device which causes the said plate to pivot comprises at least one rod coupled with a piston.

The present invention will be better understood with reference to the description of one exemplary embodiment and to the attached drawings, in which:

DESCRIPTION OF THE PREFERRED EMBODIMENTS

Figure 1:
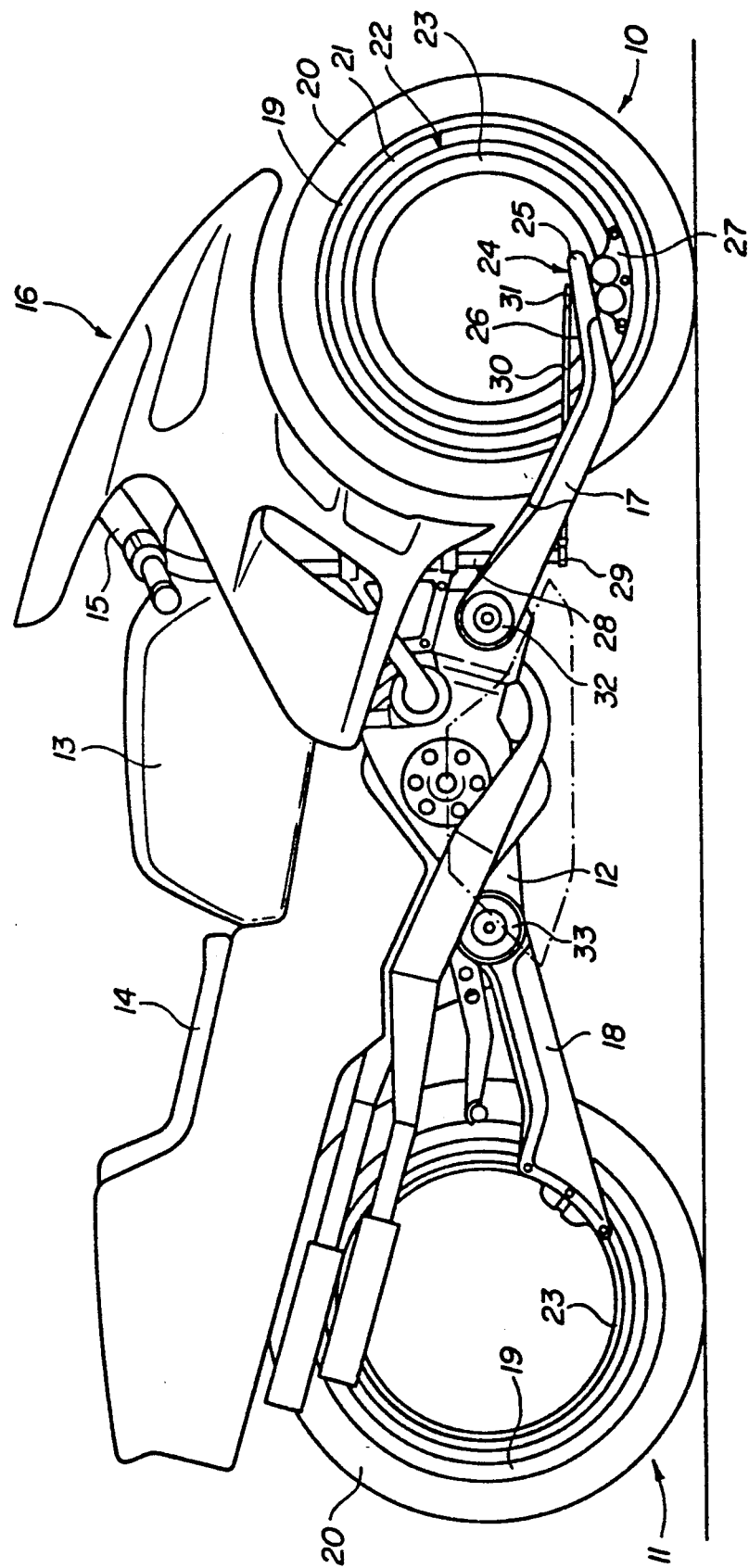
FIG. 1 is an elevational view of a motorcycle constituting a preferred embodiment of the vehicle according to the invention.

The motorcycle shown in FIG. 1 comprises in known manner a front wheel 10, a rear wheel 11, a motor 12, a gas tank 13 and a seat 14, these various elements being covered by a wind foil 16. The front wheel is attached to the motor by means of at least one arm 17 which may also be a fork shaped element. The rear wheel 11 is preferably held by only one arm 18 which may also be replaced by a forked element. Each wheel has a rim 19 on which there is mounted a tire 20. Rim 19 is attached to an exterior annular element 21 of a crown shaped ball bearing 22. Arms 17 and 18 are respectively attached to an interior annular element 23 of bearings 22 corresponding to front and rear wheels 10 and 11, respectively.

At its anterior extremity arm 17 has a second crown shaped bearing 24, exterior annular element 25 of which is rigidly attached to said extremity of arm 17, or held by the two branches of the fork if arm 17 is replaced by a fork, and interior annular element 26 of said second bearing 24 is rigidly attached to interior annular element 23 of first bearing 22 of front wheel 10, which is the drive wheel, by means of a bracket 27. Said second bearing 24 is disposed symmetrically and perpendicularly to the plane of the first bearing. Its axis passes through the theoretical center of the wheel.

Note that handlebar 15 is connected to interior annular element 25 of second bearing 24 by means of a rod consisting of a generally vertical shaft 28, articulated at its extremity 29 to a generally horizontal shaft 30 which is connected to said annular element 25 by means of a ball joint 31.

An imaginary line connecting the articulation point of handlebar 15 and the pivoting point of the wheel, which actually corresponds to the center of the second wheel, would also pass through the theoretical center of the wheel.

In this embodiment, the two arms 17 and 18 are directly articulated at 32 and 33, respectively, to the engine block itself or to a support for said block. Suspension may be achieved according to various known principles, notably by means of a carbon fiber spring and conventional shock absorbers attached to arms 17 and 18.

Because of this construction, and especially because of the unique concept of the wheels, conventional heavy, cumbersome hubs are virtually non-existent and all forces are transmitted directly to the wheels at points located as close as possible to the area of contact between the tires and the road surface.

Figure 2:
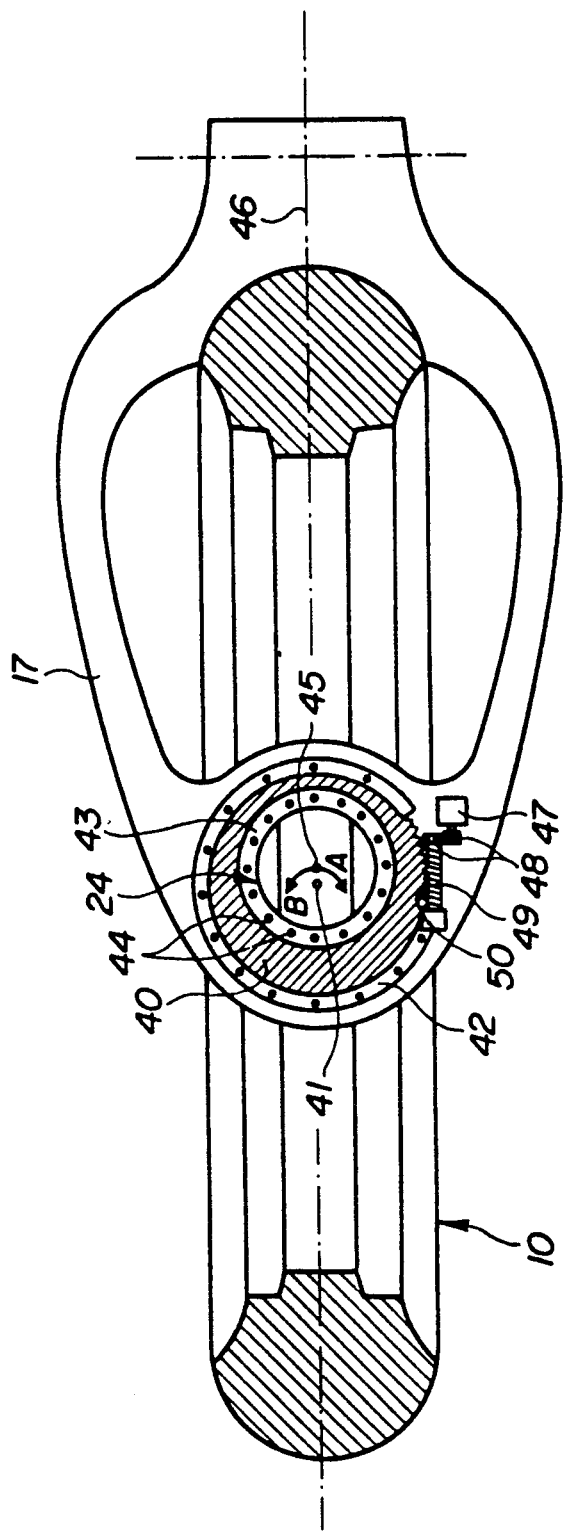
FIG. 2 is a schematic view from above, partially in cross-section, of the connection between the suspension arm and the drive wheel of the vehicle illustrated in FIG. 1.

With reference to FIG. 2, drive wheel 10 is articulated by means of second bearing 24 which is mounted in an appropriate circular opening in a plate 40 disposed to pivot around an axle 41 and held by an annular guide 42 integral with suspension arm 17 of the vehicle. In the example shown, the exterior element of bearing 24 is joined to plate 40 by means of a connecting ring 43 and a unit of bolts 44, and the interior element of bearing 24 is coupled with interior element 23 (not shown in this view) of first bearing 22 of wheel 10. Annular guide 42 is designed so that plate 40 may turen around its axis of rotation 41. Since second bearing 24 is excentrically mounted on plate 40, one pivoting motion of the plate around its axis 41 has the effect of displacing axle 45 of the second bearing in a circular path centered around axle 41 and represented schematically by arrows A and B. This has the effect of shifting median axis 46 of the wheel from its normal position to one side or the other and, particularly at critical moments, permits displacement of the point of contact between the wheel and the road in relation to the projection of the vehicle's center of gravity on the road. As a consequence, the supporting surface of the vehicle is enlarged and its stability increases because the limit of stability has been displaced.

This effect is preferably controlled by an electric motor 47 capable of driving a gear train 48, coupled with an endless screw 49 which engages a toothed element 50 integral with plate 40, in one direction or the other. This toothed portion may consist of the plate itself or of another element attached to said plate. Electric motor 47 may be controlled directly by the driver or by an electronic circuit connected to a receptor designed to detect critical vehicle inclination or the beginning of a skid, etc.

It should be understood that the electrical motor and screw control could be replaced with any other appropriate mechanical or electro-mechanical device. In particular, the pivoting of plate 40 could be brought about by means of a piston or a hydraulic motor, an electromagnet with a piston core, etc.

I claim:

1. Motorized or tractor drawn vehicle designed to travel on a particular surface, said vehicle comprising at least two wheels, at least one of which is a drive wheel, each of said wheels comprising a central portion connected to a base structure of the vehicle and a peripheral portion concentric to the said central portion and disposed to turn about the central portion, said central portion and said peripheral portion being interconnected by at least a first ring shaped bearing, said first bearing comprising at least one interior annular element integral with the said central portion of the wheel and at least one peripheral annular element concentric to said interior annular element and integral with the said peripheral portion, the latter having a contact means appropriate to the nature of the surface with which the vehicle will be in contact, and the said central portion of the wheel being connected to the base structure of the vehicle at least one connection point which is off-center on the wheel, wherein the drive wheel is connected to the base structure of the vehicle by at least one second bearing disposed in a plane perpendicular to the plane of the first bearing and comprising a first interior element integral with the interior annular element of the said first bearing and a second exterior element integral with the base structure of the vehicle, characterized in that the said second bearing (24) is eccentrically mounted on a plate (40) pivotable around an axle (41) perpendicular to the plane of the plate and parallel to the arc (45) of the second bearing (24) and in that the vehicle is provided with a device disposed to cause the said plate (40) to pivot around its axle (41).

2. Vehicle according to claim 1, characterized in that the plate (40) is mounted in an annular guide (42) integral with the suspension arm (17) of the drive wheel (10) of the vehicle.

3. Vehicle according to claim 1, characterized in that the device for causing the said plate (40) to pivot comprises a screw (49) driven by an electric motor (47), said screw engaging a toothed element (50) integral with the said plate.

4. Vehicle according to claim 1, characterized in that the said second bearing is mounted in an off-center opening disposed in the plate (40).

5. Vehicle according to claim 1, characterized in that the said second bearing (24) is attached to the plate (40) by means of its second exterior element.

6. Vehicle according to claim 5, characterized in that the said second exterior element of the second bearing (24) is attached to the plate (40) by a peripheral connecting ring (43) in the off-center opening disposed in said plate.

7. Vehicle according to claim 1, characterized in that the device for causing the said plate (40) to pivot

* * * * *

UNITED STATES PATENT AND TRADEMARK OFFICE
CERTIFICATE OF CORRECTION

PATENT NO. :  5,121,809

DATED : June 16, 1992

INVENTOR(S) :  Franco SBARRO

It is certified that error appears in the above-identified patent and that said Letters Patent is hereby corrected as shown below:

Column 4, line 51 add --comprises at least the ball bearing coupled with a piston.--.

Signed and Sealed this

Twentieth Day of July, 1993

Attest:

MICHAEL K. KIRK

Attesting Officer

Acting Commissioner of Patents and Trademarks